United States Patent

Lee et al.

(10) Patent No.: US 10,220,721 B2
(45) Date of Patent: Mar. 5, 2019

(54) SYSTEM AND METHOD FOR CONTROLLING A RELAY OF AN AUXILIARY BATTERY

(71) Applicant: HYUNDAI MOTOR COMPANY, Seoul (KR)

(72) Inventors: Ho Joong Lee, Anyang-si (KR); Dong Jun Lee, Suwon-si (KR); Na Lae Kwon, Seoul (KR); Jee Heon Kim, Guri-si (KR); Won Kyoung Choi, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/366,854

(22) Filed: Dec. 1, 2016

(65) Prior Publication Data

US 2018/0099578 A1  Apr. 12, 2018

(30) Foreign Application Priority Data

Oct. 7, 2016 (KR) .................. 10-2016-0129935

(51) Int. Cl.
*H02J 7/00* (2006.01)
*B60L 11/18* (2006.01)

(52) U.S. Cl.
CPC ........ *B60L 11/1864* (2013.01); *B60L 11/1861* (2013.01); *H02J 7/0021* (2013.01);
(Continued)

(58) Field of Classification Search
CPC ............. H01L 27/092; H01L 29/66636; H01L 29/0847; H01L 29/665; H01L 29/4175;
(Continued)

(56) References Cited

U.S. PATENT DOCUMENTS

| 8,203,232 B2 * | 6/2012 | Pino ................... B60L 3/12 307/10.1 |
| 8,531,053 B2 | 9/2013 | Choi et al. |

(Continued)

FOREIGN PATENT DOCUMENTS

| KR | 1019970055036 | 7/1997 |
| KR | 1020060003520 | 1/2006 |

(Continued)

OTHER PUBLICATIONS

KR Notice of Allowance Apr. 11, 2018, Notice of Allowance in corresponding Korean Patent Application No. 10-2016-0129935; dated Apr. 11, 2018; 2 pages.

*Primary Examiner* — Nha T Nguyen
(74) *Attorney, Agent, or Firm* — Lempia Summerfield Katz LLC

(57) ABSTRACT

A method for controlling a relay of an auxiliary battery by a controller includes deciding whether or not a low direct current (DC) to DC converter (LDC) supplies power required in an electronic load in a state of charge (SOC) maintaining mode of the auxiliary battery. As a result of the decision, a turn-on state of the relay in which power of the auxiliary battery is supplied to the electronic load is maintained when the LDC does not supply the power required in the electronic load. As a result of the decision, the relay is turned off so that power of the auxiliary battery is not supplied to the electronic load when the LDC supplies the power required in the electronic load.

8 Claims, 3 Drawing Sheets

(52) U.S. Cl.
CPC .......... *H02J 7/0054* (2013.01); *H02J 7/0068* (2013.01); *B60L 2210/10* (2013.01); *H02J 7/0029* (2013.01); *H02J 2007/0039* (2013.01); *Y02T 10/7055* (2013.01); *Y10S 903/907* (2013.01)

(58) Field of Classification Search
CPC ........... H01L 23/535; H01L 21/823807; H01L 21/823814; H01L 21/823481; H01L 21/823878; H01L 21/76897; B60L 11/1864; B60L 11/1861; B60L 2210/10; H02J 7/0054; H02J 7/0021; H02J 7/0068; H02J 2007/0039; H02J 7/0029; Y02T 10/7055; Y10S 903/907
See application file for complete search history.

(56) References Cited

U.S. PATENT DOCUMENTS

| | | | |
|---|---|---|---|
| 9,365,114 B2 * | 6/2016 | Kim | B60L 1/00 |
| 9,428,122 B2 | 8/2016 | Lee | |
| 9,809,126 B2 * | 11/2017 | Nakazawa | B60L 11/1868 |
| 2001/0019224 A1 * | 9/2001 | Amano | H02J 9/002 |
| | | | 307/10.7 |
| 2005/0029867 A1 * | 2/2005 | Wood | H02J 1/08 |
| | | | 307/10.1 |
| 2007/0032915 A1 * | 2/2007 | Yamaguchi | H02J 7/1423 |
| | | | 701/1 |
| 2010/0066302 A1 * | 3/2010 | Gregg | B60W 10/26 |
| | | | 320/104 |
| 2011/0133694 A1 * | 6/2011 | Song | B60L 1/14 |
| | | | 320/109 |
| 2012/0123625 A1 * | 5/2012 | Ueo | B60L 3/003 |
| | | | 701/22 |
| 2012/0139338 A1 | 6/2012 | Kim et al. | |
| 2012/0268068 A1 * | 10/2012 | Jung | H01M 10/44 |
| | | | 320/109 |
| 2012/0299377 A1 * | 11/2012 | Masuda | B60L 11/005 |
| | | | 307/10.1 |
| 2013/0200846 A1 * | 8/2013 | Ang | B60L 11/1816 |
| | | | 320/109 |
| 2013/0257375 A1 * | 10/2013 | Ang | H02J 7/022 |
| | | | 320/109 |
| 2014/0028087 A1 | 1/2014 | Lee | |
| 2014/0091619 A1 * | 4/2014 | Yoshimi | B60L 3/0092 |
| | | | 307/10.1 |
| 2014/0159478 A1 * | 6/2014 | Ang | B60L 1/00 |
| | | | 307/9.1 |
| 2014/0203634 A1 * | 7/2014 | Sugiyama | B60L 1/00 |
| | | | 307/10.1 |
| 2014/0214251 A1 * | 7/2014 | Sugiyama | B60W 20/00 |
| | | | 701/22 |
| 2014/0217812 A1 * | 8/2014 | Sugiyama | H02J 7/0054 |
| | | | 307/9.1 |
| 2014/0232302 A1 * | 8/2014 | Tsushima | H02J 7/00 |
| | | | 318/139 |
| 2015/0046001 A1 * | 2/2015 | Park | B60L 11/1805 |
| | | | 701/22 |
| 2015/0258911 A1 * | 9/2015 | Sugiyama | B60L 1/00 |
| | | | 701/22 |
| 2016/0036100 A1 * | 2/2016 | Wang | H01M 10/615 |
| | | | 320/127 |
| 2016/0137149 A1 * | 5/2016 | Kamachi | H02J 7/02 |
| | | | 307/10.1 |
| 2016/0325636 A1 * | 11/2016 | Masuda | B60L 11/1853 |
| 2017/0080810 A1 * | 3/2017 | Choi | B60L 11/1811 |
| 2017/0098940 A1 * | 4/2017 | Syouda | H02J 7/0016 |
| 2017/0144549 A1 * | 5/2017 | Park | B60L 3/04 |
| 2017/0305292 A1 * | 10/2017 | Minamiura | B60L 11/1874 |
| 2017/0320396 A1 * | 11/2017 | Kim | B60L 11/1811 |

FOREIGN PATENT DOCUMENTS

| | | |
|---|---|---|
| KR | 1020090059175 | 6/2009 |
| KR | 1020110057941 | 6/2011 |
| KR | 101220389 | 1/2013 |
| KR | 1020140016660 | 2/2014 |
| KR | 1020140142559 | 12/2014 |
| KR | 1020150077820 | 7/2015 |
| KR | 1020160046420 | 4/2016 |

* cited by examiner

SYSTEM AND METHOD FOR CONTROLLING A RELAY OF AN AUXILIARY BATTERY

CROSS-REFERENCE TO RELATED APPLICATION

This application is based on and claims the benefit of priority to Korean Patent Application No. 10-2016-0129935, filed on Oct. 7, 2016 in the Korean Intellectual Property Office, the disclosure of which is incorporated herein in its entirety by reference.

TECHNICAL FIELD

The present disclosure relates to a system and a method for controlling a relay of an auxiliary battery.

In the present disclosure, an eco-friendly vehicle, which is a vehicle driven by driving an electric motor using a high voltage battery, includes a hybrid electric vehicle (HEV), an electric vehicle (EV), a plug-in hybrid electric vehicle (PHEV), a fuel cell electric vehicle (FCEV), and the like.

BACKGROUND

Generally, an eco-friendly vehicle includes a high voltage battery for supplying driving power and an auxiliary battery for supplying operation power to internal electrical apparatuses (e.g., electronic loads). In this case, a low voltage direct current (DC) to DC converter (LDC) connected to the auxiliary battery and the electrical apparatuses down-converts a high voltage of the high voltage battery into a voltage for charging the auxiliary battery to charge the auxiliary battery, when a voltage of the auxiliary battery does not exceed a reference value under a control of a higher controller.

The auxiliary battery serves to supply the operation power to the electrical apparatuses such as various lamps, systems, electronic control units (ECUs), and the like, as well as start the vehicle.

Up to now, a lead-acid storage battery has been mainly used as the auxiliary battery of the vehicle since the lead-acid storage battery may be recharged and be used even though the battery is completely discharged. However, the lead-acid storage battery is heavy and has a low charging density, and lead-acid used in the lead-acid storage battery is an environmental pollution material. Therefore, recently, the lead-acid storage battery has been replaced by a 12V lithium ion battery in an eco-friendly vehicle.

However, the 12V lithium ion battery may not be recharged when the 12V lithium ion battery is over-discharged. Therefore, in order to solve this fatal disadvantage, technologies of preventing over-discharge of the 12V lithium ion battery using a relay for preventing over-discharge have been continuously developed.

Meanwhile, in the eco-friendly vehicle, charging/discharging/maintenance of the auxiliary battery have been performed by controlling an output voltage of the LDC to be varied depending on a driving condition and a battery state. Particularly, in a state of charge (SOC) maintaining mode, an output voltage value of the LDC is set so that charging/discharging (e.g., charging or discharging) of the auxiliary battery are not generated.

However, charging/discharging currents of the auxiliary battery are not accurately adjusted to 0A due to a deteriorated degree, a temperature, and the like, of the auxiliary battery, such that unnecessary charging/discharging are generated in the auxiliary battery.

Therefore, unnecessary energy loss of the high voltage battery is generated.

SUMMARY

The present disclosure solves the above-mentioned problems occurring in the prior art while advantages achieved by the prior art are maintained.

An aspect of the present disclosure provides a system and a method for controlling a relay of an auxiliary battery capable of improving fuel efficiency of an eco-friendly vehicle. The relay is controlled by efficiently controlling the relay, which supplies and blocks power of the auxiliary battery to electronic loads in the eco-friendly vehicle, to prevent charging/discharging of the auxiliary battery unnecessarily generated due to a deteriorated degree, a temperature, and the like, of the auxiliary battery in a state of charge (SOC) maintaining mode of the auxiliary battery.

Objects of the present disclosure are not limited to the above-mentioned object, and other objects and advantages of the present disclosure that are not mentioned may be understood by the following description and will be more clearly appreciated by one or more embodiments of the present disclosure. In addition, objects and advantages of the present disclosure may be realized in ways and with devices and systems mentioned in the claims and a combination thereof.

According to an embodiment of the present disclosure, a method for controlling a relay of an auxiliary battery by a controller includes deciding whether or not a low direct current (DC) to DC converter (LDC) supplies power required in an electronic load in an SOC maintaining mode of the auxiliary battery. A turn-on state of the relay in which power of the auxiliary battery is supplied to the electronic load when the LDC does not supply the power required in the electronic load is maintained as a result of the decision. The relay is turned off so that the power of the auxiliary battery is not supplied to the electronic load when the LDC supplies the power required in the electronic load as a result of the decision.

According to another embodiment of the present disclosure, a system for controlling a relay of an auxiliary battery includes the auxiliary battery, an LDC supplying power to an electronic load of an eco-friendly vehicle, a relay supplying or blocking power from the auxiliary battery to the electronic load, and a controller.

The controller decides whether or not the LDC supplies power required in the electronic load in an SOC maintaining mode of the auxiliary battery, maintains a turn-on state of the relay in which the power of the auxiliary battery is supplied to the electronic load when the LDC does not supply the power required in the electronic load, and turns off the relay so that the power of the auxiliary battery is not supplied to the electronic load when the LDC supplies the power required in the electronic load.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, in the case in which it is decided that a detailed description of a well-known technology associated with the present disclosure may unnecessarily make the present disclosure unclear, the detailed description will be omitted. Hereinafter, embodiments of the present disclosure will be described in detail with reference to the accompanying drawings.

Figure 1:
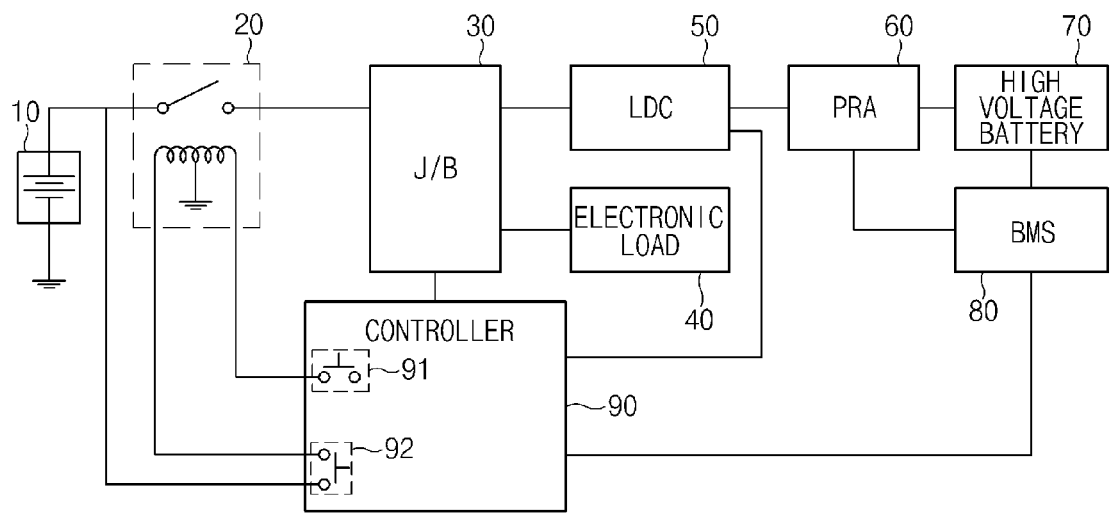
FIG. 1 is a block diagram illustrating a system for controlling a relay of an auxiliary battery according to an embodiment of the present disclosure.

FIG. 1 is a block diagram illustrating a system for controlling a relay of an auxiliary battery according to an embodiment of the present disclosure.

As illustrated in FIG. 1, the system for controlling a relay of an auxiliary battery according to an embodiment of the present disclosure includes an auxiliary battery 10, a relay 20, a junction box (J/B) 30, electronic loads 40, a low direct current (DC) to DC converter (LDC) 50, a power relay assembly 60, a high voltage battery 70, a battery management system 80, a controller 90, and the like.

The auxiliary battery 10 may be implemented by a 12V lithium ion battery, for example, and supplies power required for starting an engine of a vehicle and power required in the electronic loads 40.

The relay 20 supplies or blocks power from the auxiliary battery 10 to the electronic loads 40. In this case, the relay 20 may be implemented by a latching type relay controlled by a pulse signal.

The J/B 30 connects the auxiliary battery 10, the electronic loads 40, the LDC 50, and the controller 90 to one another.

The electronic loads 40 represent all of the electronic apparatuses operated by receiving the power supplied from the auxiliary battery 10 in an eco-friendly vehicle.

The LDC 50 converts a high voltage of the high voltage battery 70 into a low voltage (e.g., 14.3V to 13.5V), and charges the auxiliary battery 10 based on the low voltage or supplies a rated voltage required in the respective electronic loads 14.

The PRA 60 may include two relays, which are main power contacts, and a precharge relay and a precharge resistor installed on a circuit bypassing one of the two relays.

The two relays included in the PRA 60 are controlled by relay control signals output from the BMS 80 or a motor controller unit (MCU) (not illustrated).

The high voltage battery 70, which is a main battery, supplies electric energy to a motor at the time of accelerating the vehicle and stores electric energy generated by motor regeneration at the time of decelerating the vehicle or generating an engine margin output.

The BMS 80 manages the auxiliary battery 10 and the high voltage battery 70, and controls particularly charging/discharging/maintenance of the auxiliary battery 10.

The controller 90 (e.g., a physical controller device) decides whether or not the LDC 50 may supply power required in the electronic loads 40 in a state of charge (SOC) maintaining mode of the auxiliary battery 10. The controller 90 also controls the relay 20 (e.g., turns on the relay) so that the power of the auxiliary battery 10 is supplied to the electronic loads 40 in the case in which the LDC 50 may not supply the power required in the electronic loads 40, and controls the relay 20 (e.g., turns off the relay) so that the power of the auxiliary battery 10 is not supplied to the electronic loads 40 in the case in which the LDC 50 may supply the power required in the electronic loads 40. In this case, when the electronic loads using a high voltage (e.g., a high voltage in a voltage range that may be output by the LDC 50) are not operated, the controller 90 may set an output voltage of the LDC 50 to a minimum voltage to reduce energy loss due to resistive loads.

When the LDC 50 does not supply the power required in the electronic loads 40, the controller 90 turns on the relay 20 to allow the power of the auxiliary battery 10 to be supplied to the electronic loads 40. In this case, the controller 90 allows the output voltage of the LDC 50 to coincide with an output voltage of the auxiliary battery 10 in order to prevent deterioration and burning of the auxiliary battery 10 due to a surge current at the time of turning on the relay 20. The system for controlling a relay of an auxiliary battery according to one or more embodiments of the present disclosure may thus further include a voltage sensor (not illustrated) for measuring the output voltage of the auxiliary battery 10.

The controller 90 includes a first switch 91 for turning off the relay 90 and a second switch 92 for turning on the relay 20 by way of example. In this case, the controller 90 may also include one switch that may turn on/off the relay 20.

Although a form in which the system for controlling a relay of an auxiliary battery includes a separate controller 90 has been described by way of example in one or more embodiments of the present disclosure, a function of the controller 90 may also be implemented to be performed by the LDC 50 or the BMS 80.

Figure 2:
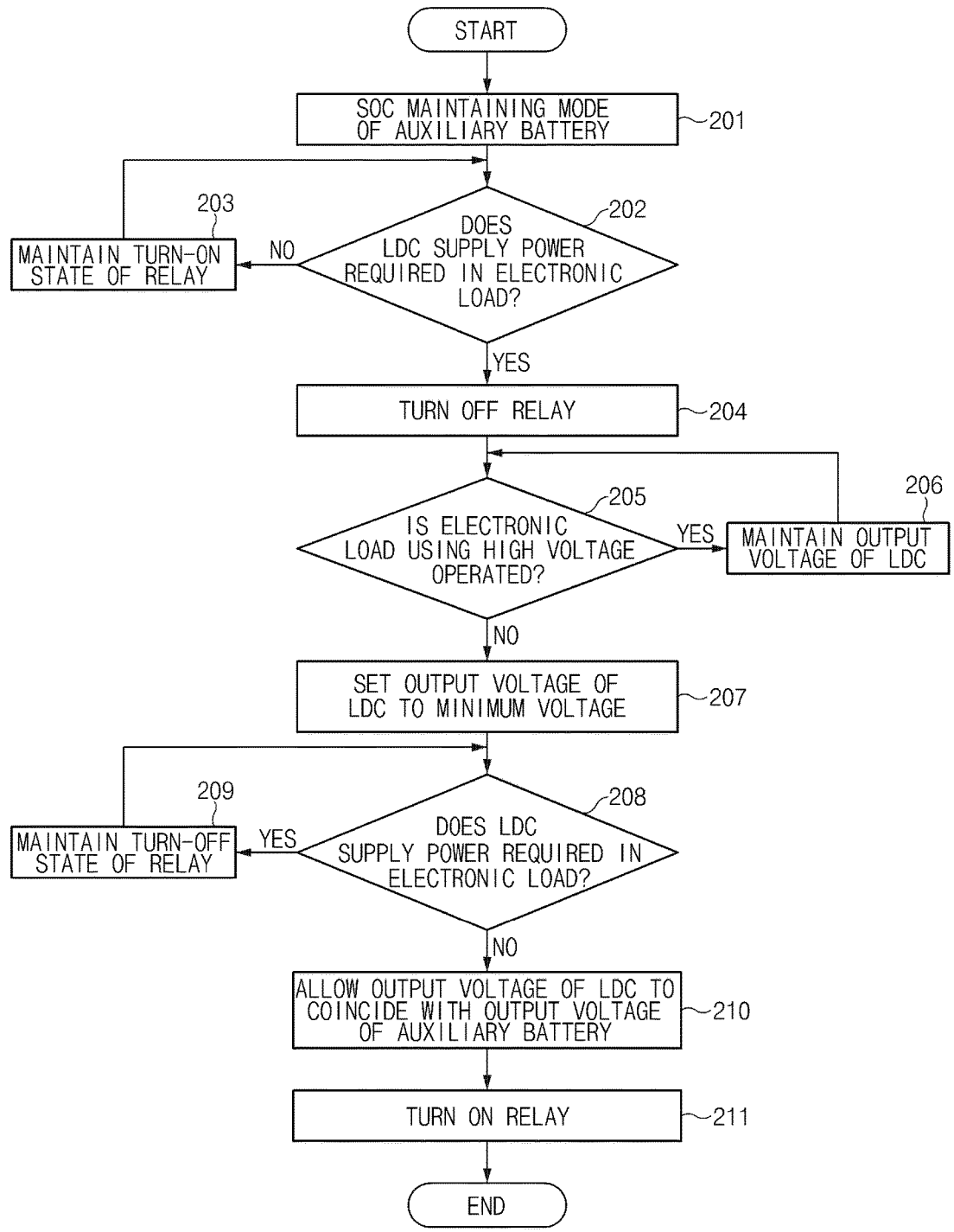
FIG. 2 is a flow chart illustrating a method for controlling a relay of an auxiliary battery according to an embodiment of the present disclosure.

FIG. 2, which is a flow chart illustrating a method for controlling a relay of an auxiliary battery according to an embodiment of the present disclosure, illustrates processes performed by the controller 90.

In the SOC maintaining mode (201) of the auxiliary battery 10, the controller 90 decides whether or not the LDC 50 may supply the power required in the electronic loads 40 (202).

When the LDC 50 may not supply the power required in the electronic loads 40 as a result (202) of the decision, a turn-on state of the relay 20 in which the power of the auxiliary battery 10 is supplied to the electronic loads 40 is maintained (203).

When the LDC 50 may supply the power required in the electronic loads 40 as a result (202) of the decision, the relay 20 is turned off so that the power of the auxiliary battery 10 is not supplied to the electronic loads 40 (204).

The controller 90 confirms whether or not the electronic loads using the high voltage (e.g., the high voltage in the voltage range that may be output by the LDC 50) are operated (205).

When the electronic loads are operated as a result (205) of the confirmation, the output voltage of the LDC 50 is maintained (206).

When the electronic loads are not operated as a result (205) of the confirmation, the output voltage of the LDC 50 is set to the minimum voltage (207).

The controller 90 decides whether or not the LDC 50 may supply the power required in the electronic loads 40 (208).

When the LDC 50 may supply the power required in the electronic loads 40 as a result (208) of the decision, a turn-off state of the relay 20 is maintained (209).

When the LDC 50 may not supply the power required in the electronic loads 40 as a result (208) of the decision, the output voltage of the LDC 50 coincides with the output voltage of the auxiliary battery 10 (210), and the relay is turned on (211).

Figure 3:
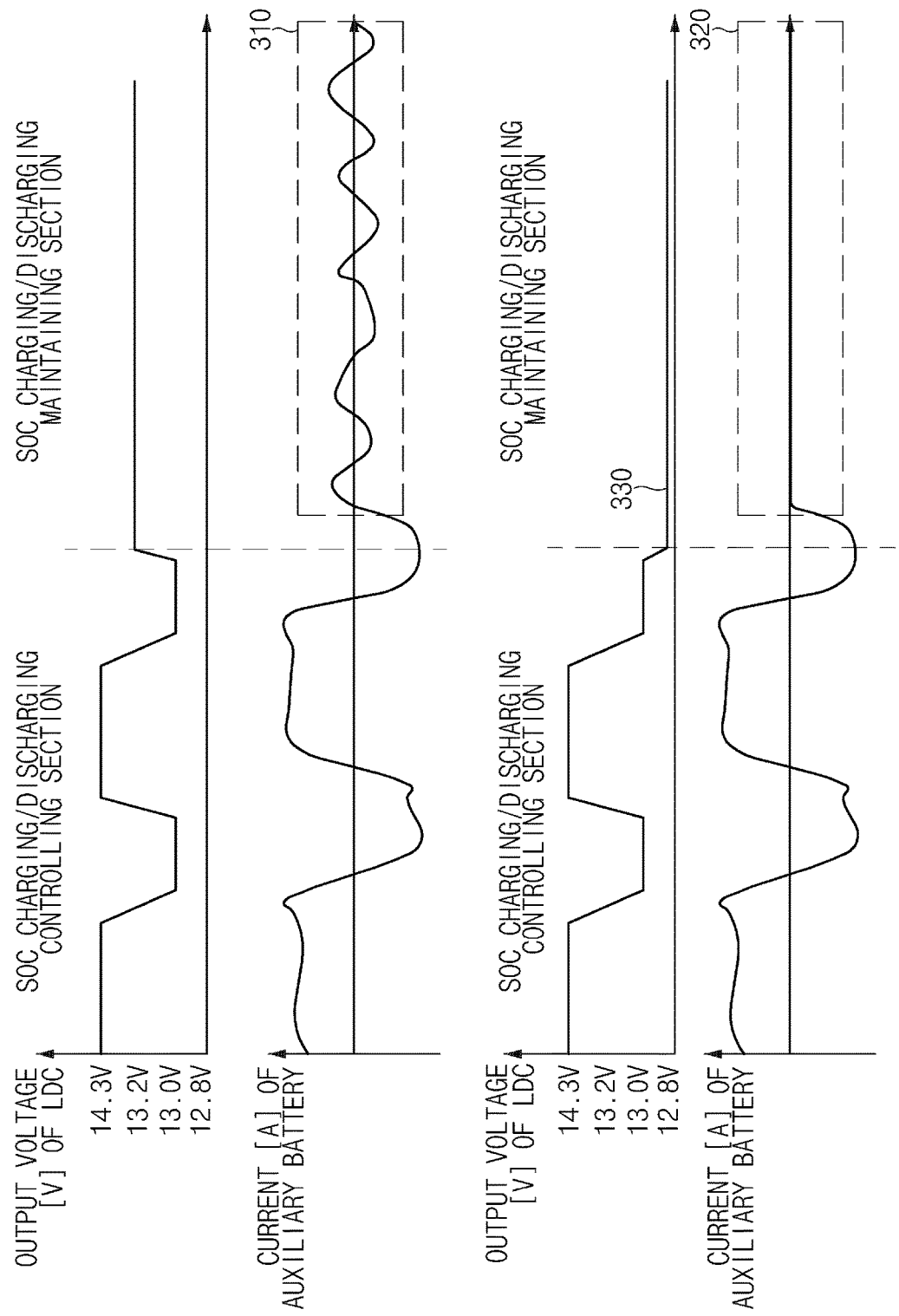
FIG. 3 is an illustrative view illustrating an effect of the method for controlling a relay of an auxiliary battery according to an embodiment of the present disclosure.

FIG. 3 is an illustrative view illustrating an effect of the method for controlling a relay of an auxiliary battery according to an embodiment of the present disclosure.

As shown with element 310 of FIG. 3, in the related art, unnecessary charging/discharging were generated in the SOC maintaining mode of the auxiliary battery 10. Therefore, energy loss of the high voltage battery 70 was generated to reduce fuel efficiency of the eco-friendly vehicle.

However, in the case in which the present disclosure is applied (320), unnecessary charging/discharging were not generated in the SOC maintaining mode of the auxiliary battery 10. In addition, in the case in which the electronic loads using the high voltage are not operated, the output voltage of the LDC 50 was set to the minimum voltage, such that the energy loss due to the resistive loads could be reduced.

The method for controlling a relay of an auxiliary battery according to one or more embodiments of the present disclosure, as described above, may be created by a computer program. In addition, codes and code segments constituting the computer program may be easily inferred by a computer programmer skilled in the related art. Further, the created computer program is stored in a computer-readable recording medium (e.g., information storing medium) and is read and executed by a computer to implement the method for controlling a relay of an auxiliary battery according to one or more embodiments of the present disclosure. Further, the computer-readable recording medium includes all types of recording media that are readable by the computer (e.g., non-transitory computer-readable recording medium).

As described above, according to one or more embodiments of the present disclosure, the relay supplying and blocking the power of the auxiliary battery to the electronic loads in the eco-friendly vehicle is controlled to fundamentally prevent charging/discharging of the auxiliary battery unnecessarily generated due to a deteriorated degree, a temperature, and the like, of the auxiliary battery in the SOC maintaining mode. This thereby makes it possible to improve the fuel efficiency of the eco-friendly vehicle.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling a relay of an auxiliary battery by a controller, the method comprising:
    deciding, by the controller, whether or not a low direct current (DC) to DC converter (LDC) supplies power required in an electronic load in a state of charge (SOC) maintaining mode of the auxiliary battery; and
    controlling, by the controller, turn-on/off states of the relay depending on a result of the decision,
    wherein the controlling of the turn-on/off states of the relay includes
        maintaining the turn-on state of the relay in which power of the auxiliary battery is supplied to the electronic load when the LDC does not supply the power required in the electronic load as a result of the decision, and
        turning off the relay so that the power of the auxiliary battery is not supplied to the electronic load when the LDC supplies the power required in the electronic load as a result of the decision.

2. The method of claim 1, wherein the controlling of the turn-on/off states of the relay further includes, after the turning-off of the relay:
    confirming whether or not the electronic load using a high voltage is operated;
    maintaining an output voltage of the LDC when the electronic load using the high voltage is operated as a result of the confirmation; and
    setting the output voltage of the LDC to a minimum voltage when the electronic load using the high voltage is not operated as a result of the confirmation.

3. The method of claim 1, wherein the controlling of the turn-on/off states of the relay further includes, after the turning-off of the relay:
    deciding whether or not the LDC supplies the power required in the electronic load;
    maintaining the turn-off state of the relay when the LDC supplies the power required in the electronic load as a result of the decision as to whether or not the LDC supplies the power required in the electronic load; and
    allowing an output voltage of the LDC to coincide with an output voltage of the auxiliary battery and turning on the relay, when the LDC does not supply the power required in the electronic load as a result of the decision as to whether or not the LDC supplies the power required in the electronic load.

4. A system for controlling a relay of an auxiliary battery, the system comprising:
    the auxiliary battery;
    a low direct current (DC) to DC converter (LDC) configured to supply power to an electronic load of a vehicle;
    a relay configured to supply or block power from the auxiliary battery to the electronic load; and
    a controller configured to decide whether or not the LDC supplies power required in the electronic load in a state of charge (SOC) maintaining mode of the auxiliary battery to control turn-on/off states of the relay,
    wherein the controller is configured to
        maintain the turn-on state of the relay in which the power of the auxiliary battery is supplied to the electronic load when the LDC does not supply the power required in the electronic load, and
        turn off the relay so that the power of the auxiliary battery is not supplied to the electronic load when the LDC supplies the power required in the electronic load.

5. The system of claim 4, wherein the controller is configured to maintain an output voltage of the LDC when the electronic load using a high voltage is operated in a state in which the relay is turned off.

6. The system of claim 4, wherein the controller is configured to set an output voltage of the LDC to a minimum voltage when the electronic load using a high voltage is not operated in a state in which the relay is turned off.

7. The system of claim 4, wherein the controller is configured to maintain the turn-off state of the relay when the LDC supplies the power required in the electronic load in a state in which the relay is turned off.

8. The system of claim 4, wherein the controller is configured to allow an output voltage of the LDC to coincide with an output voltage of the auxiliary battery and turns on the relay, when the LDC does not supply the power required in the electronic load in a state in which the relay is turned off.

\* \* \* \* \*